UNITED STATES PATENT OFFICE.

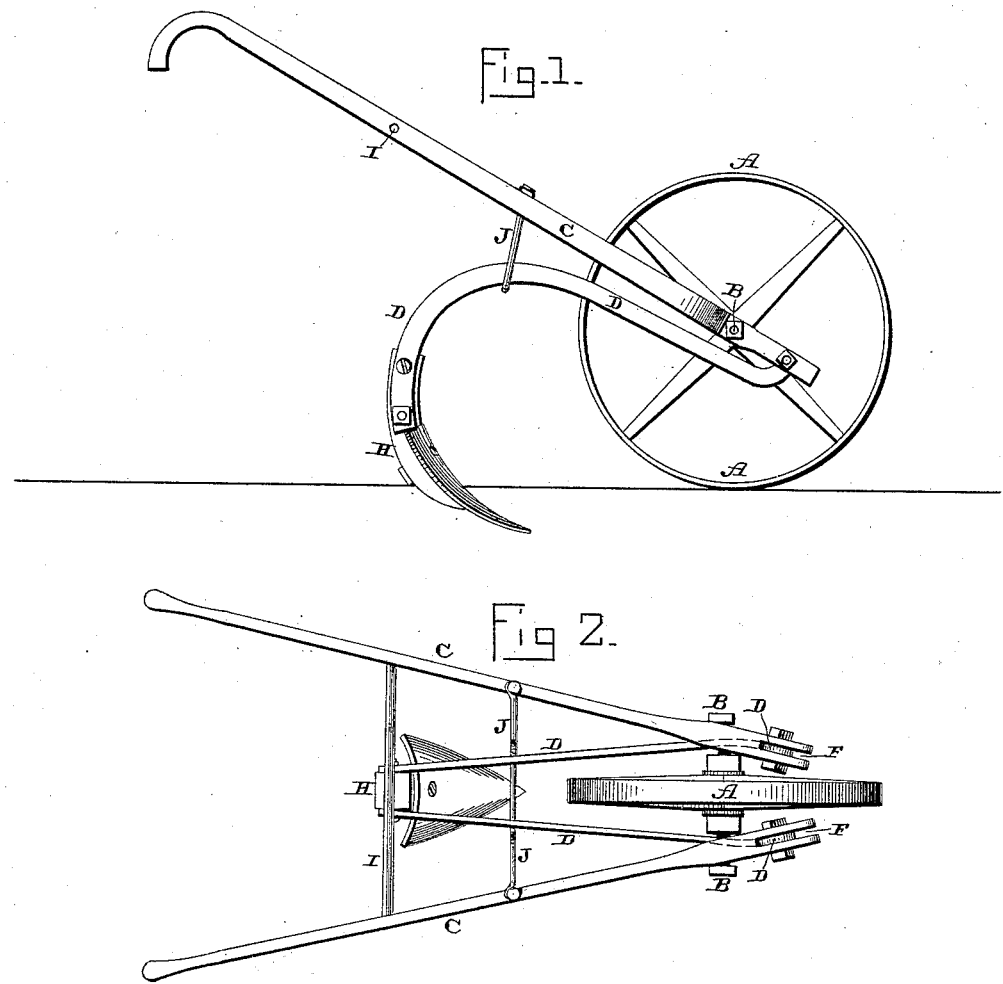

WILLIAM B. PETTY AND WILLIAM J. HOUSTON, OF ROME CITY, INDIANA.

HAND-PLOW.

SPECIFICATION forming part of Letters Patent No. 391,983, dated October 30, 1888.

Application filed July 25, 1888. Serial No. 280,984. (No model.)

*To all whom it may concern:*

Be it known that we, WILLIAM B. PETTY and WILLIAM J. HOUSTON, of Rome City, in the county of Noble and State of Indiana, have invented certain new and useful Improvements in Hand-Plows; and we do hereby declare the following to be a full, clear, and exact description of the invention, such as will enable others skilled in the art to which it pertains to make and use it, reference being had to the accompanying drawings, which form part of this specification.

Our invention relates to an improvement in hand-plows; and it consists in the combination of two handles, which are suitably braced together, a wheel, which supports their front ends, two side bars, which are pivoted at their front ends to the front ends of the handles in advance of the axle of the wheel, a bent bar or rod, which extends across between the handles and limits the distance that the plow shall drop downward, and a shovel-head, which is secured between the ends of the side bars, and to which the plow or shovel is secured, as will be more fully described hereinafter.

The object of our invention is to produce a hand-plow in which the side bars of the plow are pivoted in advance of the axle of the wheel, and in which the depth to which the shovel or plow shall run is regulated by raising or lowering the handles, and that without causing the handles to exert any pressure upon the plow, as has heretofore usually been the case with hand-plows of which we have any knowledge.

Figure 1 is a side elevation of a plow which which embodies our invention. Fig. 2 is a plan view of the same.

A represents the supporting-wheel, which is journaled upon a rod or bolt, B, which passes horizontally through the front end of the handles C, at a suitable distance in the rear of their front ends. This wheel is not pivoted or journaled at the front ends of the handles, because it is necessary to pivot the two side bars, D, in the front ends of the handles, which are provided with the slots F for that purpose in advance of the axle of the wheel. Through these slotted front ends of the handles suitable pivotal bolts are passed, and upon these bolts the side bars, D, freely move. The handles C do not exert any pressure upon the bars D for the purpose of forcing the plow or shovel G into the ground. The shovel is secured to the shovel-head H, which is secured rigidly between the rear ends of the side bars, as shown. The side bars are curved at their rear ends, and the shovel-head H conforms to this shape, and, being rounded upon its rear side, forces the plow or shovel into the ground and its weight keeps it there. Extending across from one handle to the other, in advance of the brace-rods I, is a bent rod, J, which extends downward at its center any suitable distance below the handles in the rear of the wheel and serves to limit the downward movement of the side bars, D. The side bars are connected to nothing except the handles C at their front ends and to the shovel-head H at their rear ends, and hence are perfectly free in their vertical play. Heretofore in this class of plows it has been common to bear down on the handles to cause the shovel to run deeper. By means of the construction here shown in the handles the shovel is made to run deeper, on account of the shape and weight of the shovel-head H, which keeps the shovel in the ground. If the handles are raised almost vertically, the cross-bar J will be made to catch against the lower edges of the side bars, D, and lift them; but while the plow is in operation this rod serves to prevent the plow or shovel from sinking below a certain point.

Instead of the operator having to exert a constant pressure upon the shovel, so as to keep it in the earth, our shovel is here made to automatically sink to the required depth without any pressure on the part of the operator. If the shovel begins to run too deep, by raising the ends of the handles the depth to which it shall sink is at once adjusted.

Having thus described our invention, we claim—

The combination of the handles C, the wheel A, journaled between the handles, but rearwardly of their front ends, the plow-beams pivoted to the handles forward of the wheel, the bent rod J, extending across between the handles and supporting the plow-beams while allowing them free vertical play, the shovel-head, and the shovel secured thereto, substantially as shown and described.

In testimony whereof we affix our signatures in presence of two witnesses.

WILLIAM B. PETTY.
WILLIAM J. HOUSTON.

Witnesses:
ICHABOD JONES,
JENNIE M. FISHER.